A. SOWERBUTTS.
Apparatus for Raising Sunken Vessels.
No. 148,333. Patented March 10, 1874.
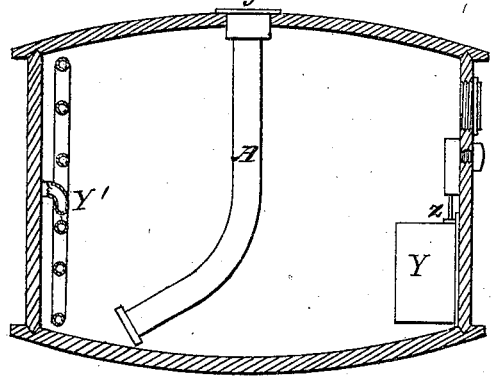
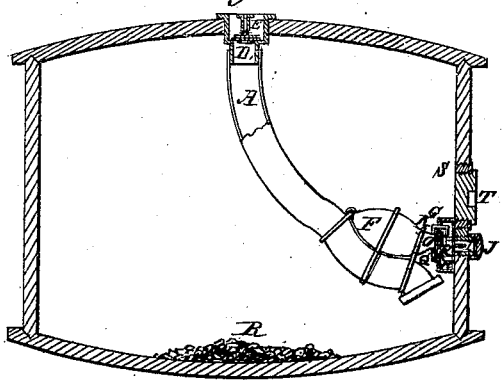
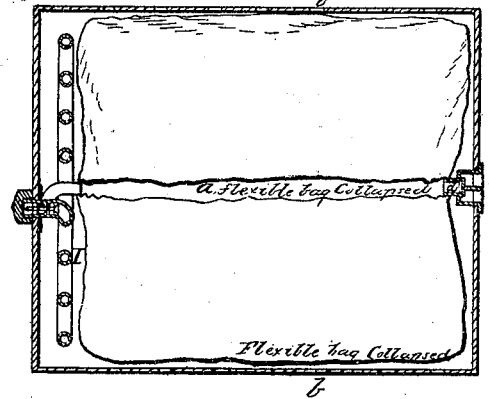
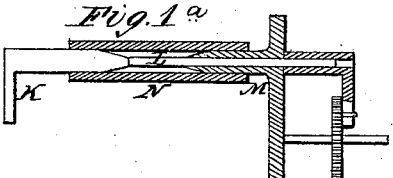
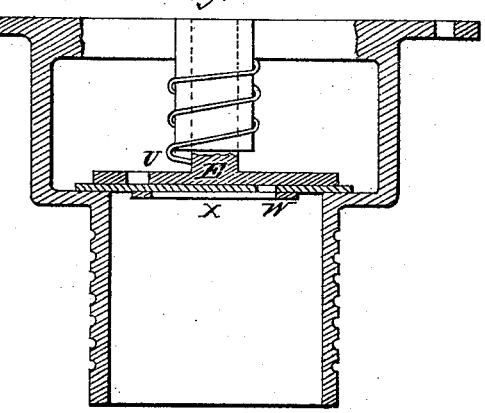
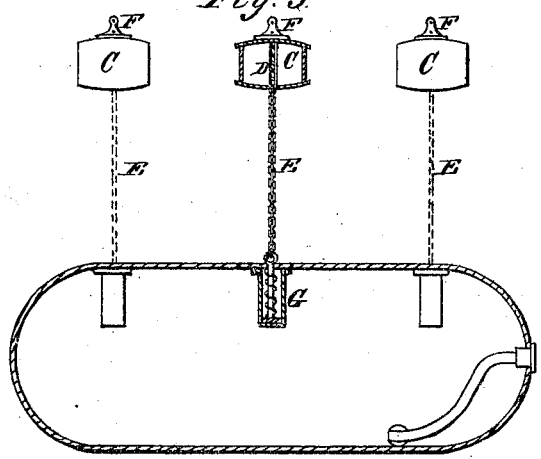
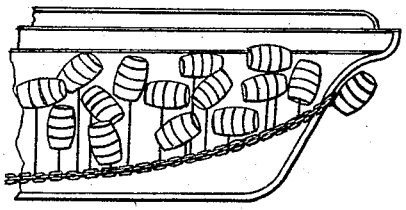
Witnesses.
H. C. Davey.
Inventor.
Alfred Sowerbutts

UNITED STATES PATENT OFFICE.

ALFRED SOWERBUTTS, OF NO. 6 WAITE STREET, TRAFALGAR ROAD, ENGLAND.

IMPROVEMENT IN APPARATUS FOR RAISING SUNKEN VESSELS.

Specification forming part of Letters Patent No. 148,333, dated March 10, 1874; application filed November 1, 1873.

*To all whom it may concern:*

Be it known that I, ALFRED SOWERBUTTS, of No. 6 Waite street, Trafalgar Road, in the county of Surrey and Kingdom of Great Britain, have invented Improved Apparatus for Raising Sunken Vessels, and other submerged, or partially submerged, bodies, of which the foling is a specification:

My invention relates to employing air-tight vessels, which, on being sunk and attached to the submerged, or partially submerged, body to be raised, are rendered buoyant by the generation within them of gas from suitable chemicals, which gas expels and takes the place of the water before contained in the said air-tight vessels. These chemicals are kept separate until the proper moment for the generation of the gas, when they are allowed to mix by means of liberating mechanism, preferably governed by clock-work, so regulated as to run a certain predetermined time before effecting the liberation. It also relates to employing, in connection with the aforesaid air-tight vessel, strong cases or metallic chambers containing compressed air or gas, the release of which, by mechanism similar to that employed for allowing the admixture of the chemicals, expels the water from the air-tight vessels and renders them buoyant. If preferred, the gas generated from the chemicals, or the compressed air, may be conveyed into air-tight flexible bags, which, being thereby inflated, become buoyant and afford lifting-power.

In the drawings, Figure 1 represents a section of a cask, which is one form of air-tight vessel which I find convenient and suitable for the application of my invention. A is a flexible tube, preferably of the kind known as suction-tube, that kind being least liable to collapse from external pressure. This flexible tube is introduced into the cask through the aperture B, and is connected to the metallic valve-seat D, which is inserted into and closes the aperture B by a water-tight joint. The valve E is arranged to open outward against a spring, as shown. Near the end of the flexible pipe A is attached a smaller vessel or bag, F, intended to contain sulphuric acid or other suitable chemical. G is a casing attached to the cask, and containing a small clock-train, H, fitted with any suitable escapement. The spring-arbor of this clock-train is seen at I, and can be readily wound up from the exterior of the cask by removing the cap J. The clock-train may be made powerful enough to work in water, or it may be isolated therefrom by making the casing G water-tight, and providing a suitable stuffing-box or other water-tight joint for the spring-arbor I. The vessel or bag F and the end of the tube A are supported by the trigger K, which, when the clock-train is inclosed in a water-tight casing, may be operated by a finger or other instrument attached to the clock-train by means of an axis, L, (see Fig. 1, *a*,) which passes through the pipe M, being connected thereto by the india-rubber tube N, which permits it to make a partial revolution while maintaining a perfectly water-tight joint, in a manner now well known. The tube A is weighted so and is of such a length that it will, when liberated by the trigger K, fall with the vessel F into the lowest part of the cask, in whatever position the said cask may be. The mouth of the vessel F is closed by the leaden washer O attached to it, being held against an elastic surface, P, by the staple Q and trigger K, so as to prevent leakage of the acid from the vessel F until the trigger K is withdrawn. When this is effected the vessel F is forced out of the staple O by a spring, and, with the tube A, falls, as above explained, the acid or other chemical being then free to flow out and act upon a quantity of carbonate or bicarbonate of an alkali, alkaline earth, or other material appropriate to the chemical contained in the vessel F placed loosely, as shown at R. I prefer to employ sulphuric acid as the chemical in the vessel F, and bicarbonate of soda as the chemical upon which it is to act, as I find that those ingredients form gas even when the acid is largely diluted by the water contained in the cask. The gas produced by the chemicals rises to the upper part of the cask, and the water is expelled through the tube A and valve E by the pressure of such gas, the cask being thus rendered buoyant in proportion to the difference of the specific gravities of the water ejected, and of the gas which has taken its place. It is convenient to have an aperture at S, by which the vessel or bag F can be adjusted in place, the said aperture being, of course, afterward closed by a suitable water-tight plug, T.

It will be readily understood that the vessel F need not necessarily be attached to the tube A, as it may be arranged in a variety of ways; but it must be so arranged that it shall, when liberated, fall into such a position that the acid shall mix with the other chemical. It may also be convenient, in some cases, to confine both chemical ingredients in closed vessels until they are required to act upon each other, when a communication may be established between such vessels, and the chemicals allowed to act by means of valves operated by mechanism similar to that before described, or of any other suitable kind. This arrangement is especially applicable when the case or ponton employed is open at the bottom, in which case the gas generated must be of such a character that it is not absorbed by water.

Fig. 2 is an enlarged section of the valve E, showing the arrangement I adopt for preventing collapse of the cask or other vessel by the hydrostatic pressure thereon, when submerged, with (as is generally the case) a portion of air contained therein. A small hole, U, is made in the metal of the valve E, and a similar hole, W, in the india-rubber or leather face X of the valve. When the external pressure exceeds the internal pressure, water will force its way through the hole U, between the valve E and flexible face X, and, by the hole W in the latter, to the inside of the cask, so as to establish an equilibrium. Instead of this arrangement an ordinary separate relief-valve, opening inward against a spring, may be employed.

Fig. 3 shows a cask or other air-tight vessel, whereto, instead of chemical means for generating gas, a metallic chamber, Y, or coil of piping Y', is fitted into which chamber, air or gas is compressed before the immersion of the air-tight vessel to a degree proportionate to the dimensions of the air-tight vessel, and to the depth to which it is to be immersed. This air or gas is liberated from the chamber Y at the proper time by the opening of a valve, Z, by mechanism similar to that described in reference to Fig. 1 for liberating the chemicals, and the water is expelled through the tube A by the pressure of such air in a similar manner.

Fig. 4 illustrates how flexible bags may be employed to receive the gas generated from the chemicals, as in Fig. 1, or the compressed air liberated from the chamber Y or Y', as in Fig. 3.

The flexible bag $a$ is shown inside a perforated case, $b$, the said case being intended to support the flexible bag and prevent its bursting. The compressed air-chamber is connected with the flexible bag $a$, and the liberation of the compressed air is effected by the clock-work, as described in reference to Fig. 1. $d$ is a relief-valve, to prevent the production of too great a pressure in the bag. The liberated air inflates the flexible bag $a$, which, in expanding, ejects the water through the perforations of the case $b$.

It will be obvious that, instead of compressed air, gas generated from chemicals, as before described, may be employed to inflate the bag.

Figs. 5 and 6 illustrate how the above described air-tight vessels, with their contained apparatus, may be attached to a sunken ship in order to raise her. A chain having been swept round or otherwise passed under the ship and made fast, the casks or other air-tight vessels are attached by divers to the said chain by ropes or chains furnished by preference with spring-hooks. These air-tight vessels may, also, in some cases, be arranged in the interior of the hull. In either case the buoyancy resulting from the generation of the gas, or liberation of the compressed air, will raise the ship.

It will be understood that the liberating mechanism of each cask may be set or wound up, so that the buoyancy of all the casks shall act at once, or successively, as may be most convenient or suitable, and also that, instead of casks, metal cases or pontons may be employed.

If preferred, the mechanism for liberating the chemicals or the compressed air may be acted upon from the exterior of the casks or pontons without the intervention of clock-work, so as to be under the direct control of the diver or other operator.

Fig. 5 illustrates a method of regulating the immersion of pontons employed to partially raise a ship or other floating body. C C C are empty air-tight casks or buoys floating on the surface of the water. Each of these buoys has a metal tube, D, passing through its center. A chain, E, fastened at one end to a winch, F, passes through the tube D, and is fastened at its other end to the ponton, preferably through the medium of a spring. This spring G is intended to prevent breakage of the chain E, should extra strain be thrown upon it from any accidental cause. These pontons, being filled with sufficient water to just sink them, are lowered sufficiently far in the water by means of the winches and chains connected to the buoys C C C to allow the ropes or chains B to pass under the keel of the floating ship, so that each ponton shall occupy a position on either side of the ship, and parallel to the keel. The gas being then generated, or compressed air or gas liberated, in the pontons, as above described, the resulting buoyancy will raise the ship, as required.

I claim—

1. In connection with an apparatus for raising sunken vessels, or other submerged bodies, the means herein described of displacing or removing water from buoys or pontons by the action of gas generated from chemicals contained within the buoy or ponton, or of compressed air or gas, such compressed air or gas being generated or liberated at the will of the operator, or at a predetermined time, as specified.

2. In combination with a buoy or ponton, for raising sunken vessels, or other submerged bodies, a flexible tube, having an outwardly-opening valve, a chamber or receptacle for compressed air or gas, or for chemicals, and means for liberating the form or allowing the mixture of the latter, substantially as and for the purposes set forth.

ALFRED SOWERBUTTS.

Witnesses:
W. H. BECK,
S. E. GUNYON.